(12) United States Patent
Avitan

(10) Patent No.: US 8,462,472 B1
(45) Date of Patent: Jun. 11, 2013

(54) ELECTRIC SAFETY CIRCUIT FOR USE WITH AN ELECTRIC RECEPTACLE

(76) Inventor: Simon Avitan, Fair Lawn, NJ (US)

( * ) Notice: Subject to any disclaimer, the term of this patent is extended or adjusted under 35 U.S.C. 154(b) by 78 days.

(21) Appl. No.: 13/116,653

(22) Filed: May 26, 2011

(51) Int. Cl.
H02H 3/00 (2006.01)

(52) U.S. Cl.
USPC .......................................................... 361/42

(58) Field of Classification Search
USPC .......................................................... 361/42
See application file for complete search history.

(56) References Cited

U.S. PATENT DOCUMENTS 3,668,469 A * 6/1972 Lee .................................. 361/46

* cited by examiner

Primary Examiner — Stephen W Jackson
(74) Attorney, Agent, or Firm — Richard M. Goldberg

(57) ABSTRACT

An electric safety circuit for use with an electric receptacle includes a relay and contacts in which power from a mains is supplied through the contacts to the receptacle only when the contacts are closed; a transistor for controlling the relay to open or close the contacts; an enabling device for supplying an enabling signal to the transistor to close the contacts when a plug of an electrically connected device is inserted into the receptacle, the electrically connected device is turned on, and there is no electrical contact by a person with the power supplied to the electrically connected device; and a disabling device for supplying a disabling signal to the transistor to open the contacts when there is electrical contact by a person with the power supplied to the electrically connected device.

12 Claims, 2 Drawing Sheets

ELECTRIC SAFETY CIRCUIT FOR USE WITH AN ELECTRIC RECEPTACLE

BACKGROUND OF THE INVENTION

The present invention relates generally to an electric safety socket, and more particularly, is directed to an electric safety socket that will prevent the flow of injurious current to a person that touches a hot lead of an electrically connected device.

When a plug of an electrically connected device is inserted into a wall socket, the electrically connected device becomes operational. For example, for a heating device, the coils of the heating device have current running through them to produce heat.

However, it sometimes occurs that a person comes into contact with a hot lead of the electrically connected device. This can occur, for example, by touching the coils of the heating device, by touching the exposed contacts of a broken light bulb, by touching the hot lead through a frayed wire, etc. In such case, the high current may cause injury to the person.

SUMMARY OF THE INVENTION

Accordingly, it is an object of the present invention to provide an electric safety socket that overcomes the aforementioned problems.

It is another object of the present invention to provide an electric safety socket that permits the flow of high operating current when connected to an electrical device, but which prevents the flow of such high operating current when a person touches a hot lead of an electrically connected device.

In accordance with an aspect of the present invention, an electric safety circuit is provided for use with an electric receptacle having female electrical connectors. The electric safety circuit includes a connector having a first connector state in which power from a mains is supplied through the connector to the female electrical connectors of the receptacle and a second connector state in which power from the mains is prevented from being supplied through the connector to the female electrical connectors of the receptacle, and a control circuit for controlling the connector between the first and second connector states. The electric safety circuit further includes an enabling device for supplying an enabling signal to the control circuit to control the connector to the first connector state when a plug of an electrically connected device is inserted into the female electrical connectors of the receptacle, the electrically connected device is turned on, and there is no electrical contact by a person with the power supplied to the electrically connected device; and a disabling device for supplying a disabling signal to the control circuit to control the connector to the second connector state when the plug of the electrically connected device is inserted into the female electrical connectors of the receptacle and there is electrical contact by a person with the power supplied to the electrically connected device.

Preferably, the connector includes a relay having two contacts which are closed in the first connector state and which are open in the second connector state, and wherein the first contact is electrically connected with power from the mains and the second contact is electrically connected with the female electrical connectors.

The control circuit includes a circuit element operable between a first control state, in response to the enabling signal from the enabling device, in which a control signal is supplied by the circuit element to the connector to provide that the connector is in the first connector state, and a second control state, in response to the disabling signal from the disabling device, which prevents supply of the control signal to the connector to provide that the connector is in the second connector state. Preferably, the circuit element includes a semiconductor device that supplies the control signal to the connector in the first control state. More specifically, the semiconductor device includes a transistor having a base and an emitter-collector path, with the base being supplied with either the enabling signal from the enabling device to turn on the transistor and supply the control signal through the emitter-collector path thereof to the connector, or the disabling signal from the disabling device to turn off the transistor and prevent a signal through the emitter-collector path to the connector.

The enabling device includes an initial circuit which is turned on in response to insertion of the plug of the electrically connected device into the female electrical connectors of the receptacle to output an initial signal and which is turned off once power from the mains is supplied through the connector to the female electrical connectors of the receptacle; and an intermediary enabling circuit which supplies the enabling signal to the circuit element of the control circuit to control the circuit element in the first control state in response to the initial signal from the initial circuit.

The initial circuit includes a signal supplying element for outputting the initial signal; and an actuating element having a first side connected with positive current through the connector to the mains and a second side connected with neutral when the plug of the electrically connected device is initially inserted into the female electrical connectors of the receptacle, so as to actuate the signal supplying element to output the initial signal. The signal supplying element is an infrared transistor having a base and an emitter-collector path for outputting the initial signal, and the actuating element includes an infrared light which supplies an infrared signal to the base of the infrared transistor to turn on the infrared transistor in order to output the initial signal through the emitter-collector path thereof. The second side of the actuating element is supplied with positive current through the connector to the mains when the connector is moved to the first connector state, in order to turn off the actuating element.

The enabling device further includes a maintaining circuit that supplies a signal to the intermediary enabling circuit to control the intermediary enabling circuit to maintain the circuit element in the first control state in response to the connector being in the first connector state when the initial circuit turns off.

The disabling device includes a disabling circuit element for supplying the disabling signal to the control circuit so that the control circuit is operable in the second control state which prevents supply of the control signal to the connector to provide that the connector is in the second connector state; an intermediary disabling circuit that supplies a signal to turn on the disabling circuit element; and an initial disabling circuit which produces an initial disabling signal to control the intermediary disabling circuit to supply the signal to turn on the disabling circuit element when the plug of the electrically connected device is inserted into the female electrical connectors of the receptacle and there is electrical contact by a person with the power supplied to the electrically connected device.

The disabling circuit element includes a transistor having a base supplied with the signal from the intermediary disabling circuit, and an emitter-collector path which supplies neutral as the disabling signal to the control circuit to control the connector to the second connector state.

The initial disabling circuit includes a winding of a transformer through which power is supplied from the mains to the female electrical connectors of the receptacle, and which produces the initial disabling signal when there is electrical contact by a person with the power supplied to the electrically connected device which results in unbalance of power supplied from the mains to the female electrical connectors of the receptacle.

There is also a reset switch connected with the disabling device for deactivating the disabling device.

The above and other objects, features and advantages of the invention will become readily apparent from the following detailed description thereof which is to be read in connection with the accompanying drawings.

DETAILED DESCRIPTION

Figure 1:
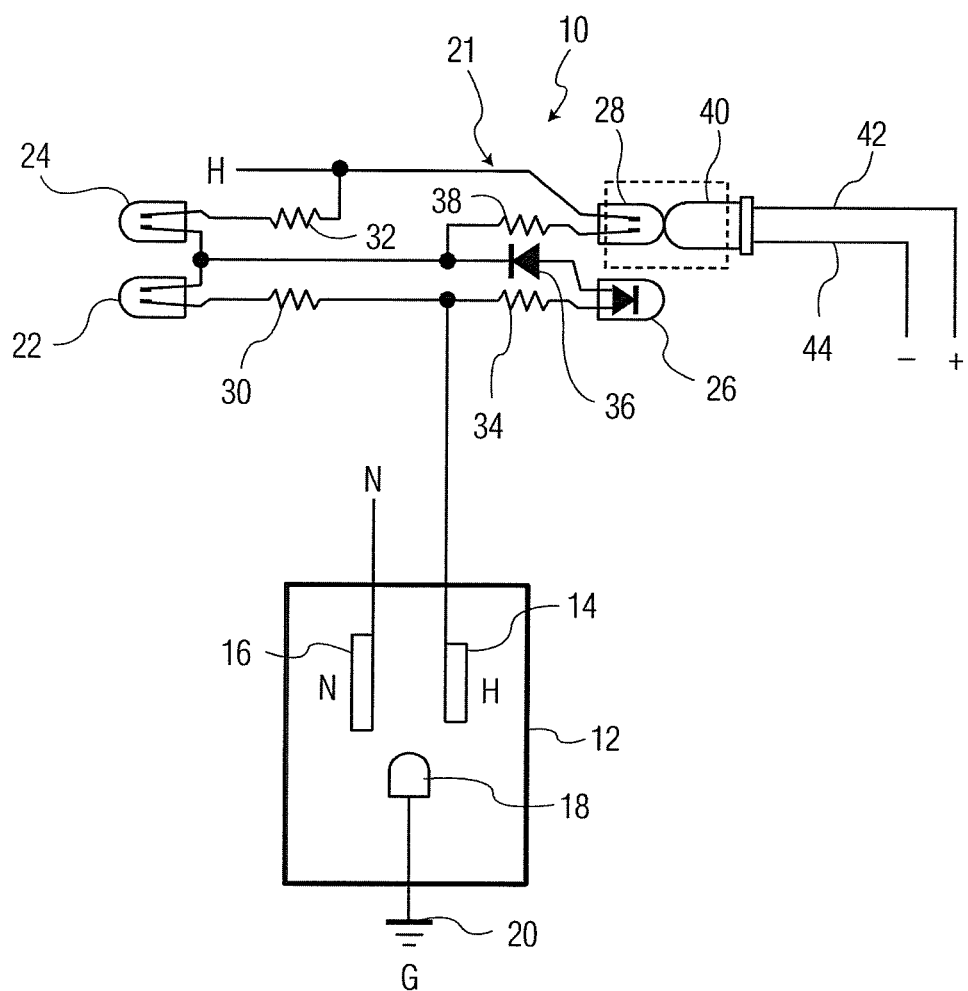
FIG. 1 is a circuit wiring diagram of the bulb/IR transistor assembly of the safety circuit according to the present invention for use with an electrical AC safety socket.

Referring to the drawings, and initially to FIG. 1 thereof, the basis for the present invention will first be discussed.

As shown therein, an electrical AC electric safety socket 10 according to the present invention is provided for removably connecting electrically connected devices to a power supply. Safety socket 10 includes a receptacle 12 having female electrical connectors 14, 16 and 18 which are adapted to receive a three prong plug of an electrically connected device. Specifically, female electrical connector 14 includes a live or hot contact H that carries live or hot current from the power supply to a load, such as the electrically connected device. Female electrical connector 16 includes a neutral contact N that returns current to the power supply. Female electrical connector 18 includes a third contact for connection to ground 20, to protect against insulation failure of the electrically connected device.

As discussed above, a problem with known sockets is that a person who touches the hot contact of an electrically connected device, for example, through a broken light bulb, a frayed wire, a heating coil of a heater, etc., will be placed in contact with a large current, which can be dangerous to the person.

In accordance with the present invention, safety socket 10 permits the flow of a high operating current when connected to an electrically connected device, but prevents the supply of such high current when a person touches a hot contact of the electrically connected device.

Specifically, a bulb/IR transistor assembly 21 which forms an initial circuit of an enabling device of the present invention, includes four lights 22, 24, 26 and 28, each of which is visible through the cover of the receptacle 12. Preferably, lights 22 and 24 are neon bulbs, light 26 is an LED light that issues a yellow or amber color when the circuit needs to be reset, and light 28 is an infrared light. Neon light 22 has one terminal connected directly to a hot contact H through a resistor 30, and neon light 24 has one terminal connected directly to a hot contact H through a resistor 32. Neon lights 22 and 24 are never seen, but are only provided for completion of the circuit. In like manner, LED green light 26 has one terminal connected directly to a hot contact H through a resistor 34. Infrared light 28 forms the actuating element of the initial circuit of the enabling device and has one terminal connected directly to a hot contact H. The other contacts of lights 22 and 24 are connected together and connected to the other terminal of light 26 through a diode 36 and the other terminal of light 28 through a resistor 38.

Bulb/IR transistor assembly 21 further includes an infrared (IR) transistor 40 as a signal supplying element of the initial circuit of the enabling device and is provided adjacent infrared light 28. Infrared transistor 40 has an input or base (not shown) and a positive emitter 42 and negative collector 44. When infrared transistor 40 is activated, current is permitted to flow from positive emitter 42 to negative collector 44. As will be discussed in greater detail hereafter, when an electrically connected device is initially connected to hot contact H and neutral contact N of receptacle 12, for example, by inserting a three prong plug thereof into female electrical connectors 14, 16 and 18, high current is permitted to flow to lights 22, 24, 26 and 28, thereby turning on lights 22, 24, 26 and 28. Because infrared light 28 is turned on, the infrared light therefrom is supplied to infrared transistor 40 to cause infrared transistor 40 to turn on, resulting in completion of the circuit and resulting in the supply of current to another circuit which supplies operating current to the electrically connected device. A portion of infrared transistor 40 and light 28 are encased in a sleeve 41.

Figure 2:
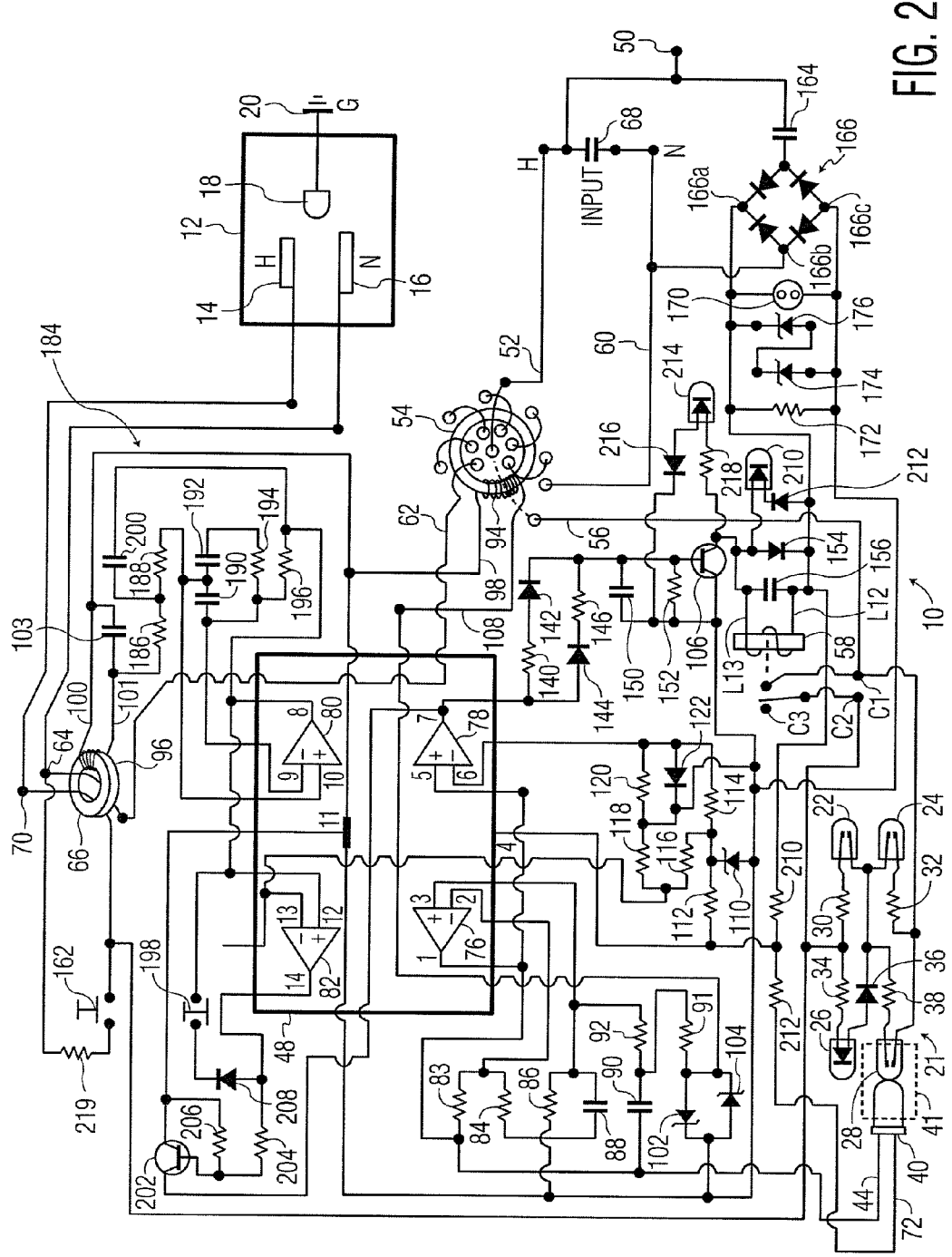
FIG. 2 is a detailed circuit wiring diagram of the entire safety circuit according to the present invention.

Referring now to FIG. 2, the complete circuit for electric AC safety socket 10 will now be described, which includes the circuit of FIG. 1.

The mains from a power supply 50, that is, the mains in the wall, is connected to electrical connectors 14 and 16 of receptacle 12 by reason of a low power quad operational amplifier 48 which is controlled by bulb/IR transistor assembly 21.

Specifically, the mains from power supply 50, that is, the mains in the wall, supplies a hot current H to an input line 52 of a first toroid or transformer 54, which is supplied through transformer 54 to a line 56 connected to a connector comprised of a relay 58 having first and second contacts C1 and C2, and particularly, to first contact C1 of relay 58. First contact C1 is also connected with one input of light 28 and through resistor 32, with one input of light 24, of bulb/IR transistor assembly. The neutral N from the mains from the wall at input line 60 is supplied to first transformer 54 and is wrapped about the toroid of first transformer 54 six times, and then exits at line 62 which is connected with line 64 through a second transformer or toroid 66, and to neutral female electrical connector 16 of receptacle 12. Lines 52 and 60 are isolated from each other by a capacitor 68.

The line 70 through second transformer 64 is connected to hot female electrical connector 14, to the second contact C2 of relay 58 and to the connection between resistors 30 and 34 of bulb/IR transistor assembly 21.

Preferably, low power quad operational amplifier 48 is an LM 324 module containing four independent, high gain, internal frequency compensated operational amplifiers 76, 78, 80 and 82, each having a positive input, a negative input and an output at pins 1-14, respectively. Operational amplifiers 76 and 78 form an intermediary enabling circuit of the enabling device, while operational amplifiers 80 and 82 form an intermediary disabling circuit of a disabling device of the present invention.

The output from the collector 44 of IR transistor 40 is connected through a resistor 83 to the negative input number 2 of operational amplifier 76. The output of resistor 83 is also connected through another resistor 84 to a parallel circuit of a resistor 86 and a capacitor 88, and the output of this parallel circuit is connected to positive input number 3 of operational amplifier 76. The output number 1 of operational amplifier is connected directly with the collector 44 of IR transistor 40 and to the positive input number 5 of operational amplifier 78.

The collector 44 of IR transistor 40 is also connected to a capacitor 90 connected in series with a resistor 92.

First transformer 54 includes a secondary winding 94 and second transformer 66 has a secondary winding 96. One of the leads 98 of secondary winding 94 and one of the leads 100 of secondary winding 96 are connected together through an input 11 of low power quad operational amplifier 48 to one side of a parallel circuit of two oppositely directed Zener diodes 102 and 104, to resistor 86, and also to the collector-emitter path of a transistor 106 which forms a control circuit of the present invention. The opposite side of the parallel circuit of the two oppositely directed Zener diodes 102 and 104, is connected to the other lead 108 of secondary winding 94, and to the connection between capacitor 90 and resistor 92 via another resistor 91.

The collector-emitter path of transistor 106 is also connected with the input of a Zener diode 110. The output of Zener diode 110 is connected through a resistor 112 to input number 4 of low power quad operational amplifier 48, through a resistor 114 to the negative input number 6 of operational amplifier 78 and through a resistor 116 to the negative input number 13 of operational amplifier 82.

Two series connected resistors 118 and 120 are connected between negative input number 6 of operational amplifier 78 and negative input number 13 of operational amplifier 82. A diode 122 is connected between the output of resistor 114 and the connection between resistors 118 and 120, with the output of diode 122 also connected to the collector-emitter path of transistor 106.

The output number 7 of operational amplifier 78 is supplied to a parallel circuit of a series connected resistor 140 and diode 142 and a series connected diode 144 and resistor 146. The output of this parallel circuit is supplied to the base of transistor 106 and through a parallel circuit of a capacitor 150 and resistor 152 to the collector of transistor 106, with this collector also being connected with the input of Zener diode 126.

The collector-emitter path of transistor 106 is connected with one side L13 of the coil of relay 58, with a parallel circuit of a diode 154 and capacitor 156 connected between sides L12 and L13 of the coil of relay 58 in order to isolate them. Relay 58 is provided to open or close contacts C1, C2 through contact C3, as will be described hereinafter.

In addition, a red LED 210 has one lead directly connected to side L13 of the coil of relay 58, and the other side L12 of relay 58 is connected through a diode 212 to the other lead of red LED 210. Red LED 210 is turned on when relay is turned on, and provides a visible indication that there is a high AC current at receptacle 12, and therefore, electrical connectors 14 and 16 of receptacle 12 are not safe to touch by a person.

A green LED 214 has one terminal connected through a diode 216 to the emitter side of transistor 106, and the other terminal is connected through a resistor 218 to the collector side of transistor 106. Green LED 214 is turned on when transistor 106 is turned off and relay 58 is turned off, and provides an indication that there is no high AC current at receptacle 12, so that electrical connectors 14 and 16 of receptacle 12 are safe to touch by a person. When transistor 106 is turned on, there is current through the emitter-collector path thereof, so that both terminals of green LED 214 are at the same voltage, so that green LED 214 is turned off.

The mains from power supply 50 also supplies a current through a capacitor 164 to a diode bridge circuit 166, one terminal 166a of which is connected to side L12 of the coil of relay 58 as a hot current, another terminal 166b of which is connected to neutral line 60 supplied with the neutral current N from the mains from power supply 50, and with another terminal 166c of which is provided with a neutral current.

An electrolytic capacitor 170, a circuit of two series connected Zener diodes 174 and 176, and a resistor 172 are connected in parallel with each other between terminals 166a and 166c of diode bridge circuit 166.

Capacitor 164, diode bridge circuit 166, electrolytic capacitor 170, Zener diodes 174 and 176 and resistor 172 function to reduce the voltage from the mains 50 to a much smaller voltage, for example, to about 20 volts DC, which is supplied to side L12 of the coil of relay 58. This voltage never appears at receptacle 12.

Second transformer 66 includes secondary winding 96 with leads 100 and 101, with leads 100 and 101 being isolated from each other by a capacitor 103. The connection of lead 100 has already been discussed above. Lead 101 is connected to low power quad operational amplifier 48 through a resistor/capacitor circuit 184. Specifically, lead 101 is connected through two series connected resistors 186 and 188 to the positive input number 10 of operational amplifier 80. The output of second resistor 188 is also connected to the connection between two capacitors 190 and 192, with the opposite side of capacitor 190 connected to the negative input number 9 of operational amplifier 80. A resistor 194 is connected in parallel with the series connection of capacitors 190 and 192. Resistor 194 is connected through another resistor 196 to the output number 8 of operational amplifier 80, to the positive input number 12 of operational amplifier 82 and to one pole of a reset switch 198. A capacitor 200 is connected between the connection point of resistors 186 and 188, and the output end of resistor 196.

Line 98 of first transformer 54 is also connected to the collector-emitter path of a transistor 202, with the base of transistor 202 connected to output number 14 of operational amplifier 82, through a resistor 204. When transistor 202 is turned on by current its base, current flows through the collector-emitter path of transistor 202. A further resistor 206 is connected between the base and collector of transistor 202. The output number 14 of operational amplifier 82 is also connected to the opposite pole of reset switch 198 through a diode 208.

Finally, there is a test switch 162 connected between contact C2 of relay 58 and line 64 of second transformer 66 via a resistor 219, for providing a test of the circuit to determine its operation.

The operation of the above circuit will now be described.

Assume first that an electrically connected device is plugged into electrical connectors 14 and 16 of receptacle 12 and the electrically connected device is turned on.

The mains or power supply 50 from the wall supplies a hot current H to input line 52 which goes through first transformer 54 to line 56 and then to contact C1 of relay 58. This hot current H is supplied to infrared light 28 and through resistor 32 to neon light 24. At this time, the neutral N from the mains from the wall at input line 60 is supplied to first toroid 54 and is wrapped about first toroid 54 six times, and then exits at line 62 which is connected with line 64 and to neutral female electrical connector 16 of receptacle 12.

Because the electrically connected device is plugged into electrical connectors 14 and 16, the hot female electrical connector 14 is connected to neutral through neutral female electrical connector 16, and as a result, a neutral current is supplied to line 70 and thereby to contact C2. During this time, relay 58 is open so that contacts C1 and C2 are not connected to each other. The neutral current is also supplied to resistors 30 and 34. As a result, all lights 22, 24, 26 and 28 are illuminated, that is, because there is a hot current at the contact C1 side of bulb/IR transistor assembly 21 and a neutral current at the contact C2 side of bulb/IR transistor assembly 21.

This results in infrared transistor 40 turning on, so that current flows from the emitter 42 to the collector 44 thereof.

At this time, the hot current H from the mains is also supplied through capacitor 164, diode bridge 166, electrolytic capacitor 170 and Zener diodes 174 and 176 to reduce the voltage to a smaller level, for example, about 20 volts. This low voltage is supplied to one side L12 of main relay 58 and then through resistors 210 and 212 to the emitter of infrared transistor 40. This low voltage is then passed to the collector of infrared transistor 40 which has been turned on by infrared light 28, and supplied directly, and via resistors 83, 84, 86, 92, capacitors 88 and 90, and Zener diodes 102 and 104, to the input numbers 2 and 3 of operational amplifier 76, the output number 1 of which is supplied to the positive input number 5 of operational amplifier 78. The low voltage is also supplied through resistors 114, 118 and 120 and diodes 110 and 122 to the negative input number 6 of operational amplifier 78. As a result, the output number 7 of operational amplifier 78 supplies a positive current to the base of transistor 106 through resistors 140, 146 and 152, diodes 142 and 144 and capacitor 150, which results in transistor 148 being turned on. As a result, the other end L13 of main relay 58 is at neutral or negative, because the tail or negative end of Zener diode 174 near the mains, is connected through the collector-emitter path of transistor 106 to the other end L13 of main relay 58, and therefore, main relay 58 is actuated to close contacts C1 and C2 through contact C3.

At this time, the hot current H at contact C1 is connected as well to contact C2 so that both sides of bulb/IR transistor assembly 21 are now supplied with hot current H, whereby bulb/IR transistor assembly 21 turns off, so that lights 22, 24, 26 and 28 are no longer illuminated. This means that IR transistor 40 is also turned off and the emitter-collector path thereof is closed.

At this time, because bulb/IR transistor assembly 21 is turned off, no current flows through the emitter-collector path of IR transistor 40, and therefore, there is no current from this path to operational amplifiers 76 and 78. However, because contacts C1 and C2 are closed, a small current is provided at the output winding 94 of transformer 54, and particularly, at line 98, which is supplied via resistors 83, 84, 91, 92, capacitors 88 and 90, and Zener diodes 102 and 104, to the input numbers 2 and 3 of operational amplifier 76. As a result, the winding 94 of transformer 54 now replaces and supplies the operating current to operational amplifiers 76 and 78 in order to maintain a positive input to transistor 106 to maintain transistor 106 in an on state, so that contacts C1 and C2 remain closed. Therefore, first transformer 54 maintains the circuit on, to supply hot current H to hot female electrical connector 14 when the bulb/IR transistor assembly 21 is off.

At this time, the hot current from contact C2 is supplied to line 70 and then to hot female electrical connector 14 of receptacle 12. As a result, full power is supplied to the electrically connected device for operating the same.

Also, at this time, since there is a balance between the currents at lines 64 and 70, there is no power output at secondary winding 96 of transformer 66. This means that there is no current supplied to operational amplifiers 80 and 82.

If, at this time, a person touches a frayed wire, touches a contact of a broken bulb, touches a heater coil of a heater of the electrically connected device, etc., there is immediate leakage to ground. Therefore, at this time, second transformer 66 is no longer balanced between the positive and negative leads thereof on wires 64 and 70, so that a low voltage is supplied by winding 96 of second transformer 66 which is fed to operational amplifiers 80 and 82 through resistors 186, 188, 194 and 196 and capacitors 190, 192 and 200, whereby the output number 14 of operational amplifier 82 supplies a positive voltage to the base of transistor 202 to turn transistor 202 on. This results in the tail or negative end of Zener diode 174 near the mains, being connected through the input number 11 of low power quad operational amplifier 48 to the collector-emitter path of transistor 202. Since this path is connected to the output number 7 of operational amplifier 78, this output number 7 is changed to a negative or neutral value, which results in transistor 106 turning off. As a result, relay 58 is de-energized so that contacts C1 and C2 once again open, and the hot current H is no longer supplied through contacts C1 and C2 to line 70 and hot female electrical connector 14. In this regard, transistor 202 forms the disabling circuit element of the disabling device of the present invention, operational amplifiers 80 and 82 form the intermediary disabling circuit of the disabling device, and winding 96 forms the initial disabling circuit of the disabling device of the present invention. Also, at this time, light bulb 26 is turned on to provide a visible yellow light as an indication that a reset is required.

The above operation occurs extremely fast, that is, in milliseconds, so that there is no injury to the person.

The circuit can be reset as follows. Specifically, it is only necessary to press reset switch 198. This functions to disconnect transistor 102 from the circuit and thereby turn transistor 102 off, thereby removing the negative or neutral current at the base of transistor 106, whereby a positive current is automatically supplied again to the base of transistor 106 in the manner discussed above. The operation then returns to the initial condition as discussed above in which it was assumed that an electrically connected device is plugged into electrical connectors 14 and 16 of receptacle 12, so that the operation of the electrically connected device starts again, in the same manner as discussed above.

If no plug of an electrically connected device is inserted into female electrical connectors 14, 16 and 18, then contacts C1 and C2 are open, and a hot current H is provided at one side of bulb/IR transistor assembly 21. However, the opposite side of bulb/IR transistor assembly 21 is connected to contact C2 and with line 70 and hot female electrical connector 14 which are all open. Since there is an open circuit, bulb/IR transistor assembly 21 is turned off and no current is supplied to hot female electrical connector 14 of receptacle 12.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. An electric safety circuit for use with an electric receptacle having female electrical connectors, said electric safety circuit comprising:

a connector having a first connector state in which power from a mains is supplied through the connector to the female electrical connectors of the receptacle and a second connector state in which power from the mains is prevented from being supplied through the connector to the female electrical connectors of the receptacle, wherein said connector includes a relay having first and second contacts which are closed in the first connector state and which are open in the second connector state, and wherein said first contact is electrically connected with power from the mains and the second contact is electrically connected with the female electrical connectors;

a control circuit for controlling operation of said connector between said first and second connector states;

an enabling device for supplying an enabling signal to said control circuit to control said connector to said first connector state when a plug of an electrically connected device is inserted into the female electrical connectors of the receptacle, the electrically connected device is turned on, and there is no electrical contact by a person with the power supplied to said electrically connected device; and a disabling device for supplying a disabling signal to said control circuit to control said connector to said second connector state when the plug of the electrically connected device is inserted into the female electrical connectors of the receptacle and there is electrical contact by a person with the power supplied to said electrically connected device; and wherein said control circuit includes a circuit element operable between:
- a first control state, in response to said enabling signal from said enabling device, in which a control signal is supplied by said circuit element to said connector to provide that said connector is in said first connector state, and
- a second control state, in response to said disabling signal from said disabling device, which prevents supply of said control signal to said connector to provide that said connector is in said second connector state, and
- said circuit element includes a semiconductor device that supplies said control signal to said connector in said first control state.

2. An electric safety socket according to claim 1, wherein said semiconductor device includes a transistor having a base and an emitter-collector path, with said base being supplied with one of:
a) said enabling signal from said enabling device to turn on the transistor and supply the control signal through the emitter-collector path thereof to said connector, and
b) said disabling signal from said disabling device to turn off the transistor and prevent a signal through the emitter-collector path to said connector.

3. An electric safety circuit for use with an electric receptacle having female electrical connectors, said electric safety circuit comprising:

a connector having a first connector state in which power from a mains is supplied through the connector to the female electrical connectors of the receptacle and a second connector state in which power from the mains is prevented from being supplied through the connector to the female electrical connectors of the receptacle, wherein said connector includes a relay having first and second contacts which are closed in the first connector state and which are open in the second connector state, and wherein said first contact is electrically connected with power from the mains and the second contact is electrically connected with the female electrical connectors;

a control circuit for controlling operation of said connector between said first and second connector states;

an enabling device for supplying an enabling signal to said control circuit to control said connector to said first connector state when a plug of an electrically connected device is inserted into the female electrical connectors of the receptacle, the electrically connected device is turned on, and there is no electrical contact by a person with the power supplied to said electrically connected device; and a disabling device for supplying a disabling signal to said control circuit to control said connector to said second connector state when the plug of the electrically connected device is inserted into the female electrical connectors of the receptacle and there is electrical contact by a person with the power supplied to said electrically connected device;

wherein said control circuit includes a circuit element operable between:
- a first control state, in response to said enabling signal from said enabling device, in which a control signal is supplied by said circuit element to said connector to provide that said connector is in said first connector state, and
- a second control state, in response to said disabling signal from said disabling device, which prevents supply of said control signal to said connector to provide that said connector is in said second connector state, and wherein said enabling device includes:
- an initial circuit which is turned on in response to insertion of the plug of the electrically connected device into the female electrical connectors of the receptacle to output an initial signal and which is turned off once power from the mains is supplied through the connector to the female electrical connectors of the receptacle, and
- an intermediary enabling circuit which supplies the enabling signal to said circuit element of the control circuit to control said circuit element in said first control state in response to said initial signal from said initial circuit.

4. An electric safety socket according to claim 3, wherein said enabling device further includes a maintaining circuit that supplies a signal to said intermediary enabling circuit to control said intermediary enabling circuit to maintain said circuit element in said first control state in response to said connector being in said first connector state when said initial circuit turns off.

5. An electric safety socket according to claim 3, wherein said initial circuit includes:

a signal supplying element for outputting the initial signal; and an actuating element having a first side connected with positive current through the connector to the mains and a second side connected with neutral when the plug of the electrically connected device is initially inserted into the female electrical connectors of the receptacle, so as to actuate said signal supplying element to output said initial signal.

6. An electric safety socket according to claim 5, wherein said signal supplying element is an infrared transistor having a base and an emitter-collector path for outputting the initial signal, and said actuating element includes an infrared light which supplies an infrared signal to the base of said infrared transistor to turn on said infrared transistor in order to output said initial signal through the emitter-collector path thereof.

7. An electric safety socket according to claim 6, further including a sleeve which encloses said infrared transistor and said infrared light.

8. An electric safety socket according to claim 5, wherein said second side of the actuating element is supplied with positive current through the connector to the mains when the connector is moved to said first connector state, in order to turn off said actuating element.

9. An electric safety circuit for use with an electric receptacle having female electrical connectors, said electric safety circuit comprising:
- a connector having a first connector state in which power from a mains is supplied through the connector to the female electrical connectors of the receptacle and a second connector state in which power from the mains is prevented from being supplied through the connector to the female electrical connectors of the receptacle, wherein said connector includes a relay having first and second contacts which are closed in the first connector state and which are open in the second connector state, and wherein said first contact is electrically connected with power from the mains and the second contact is electrically connected with the female electrical connectors;
- a control circuit for controlling operation of said connector between said first and second connector states;
- an enabling device for supplying an enabling signal to said control circuit to control said connector to said first connector state when a plug of an electrically connected device is inserted into the female electrical connectors of the receptacle, the electrically connected device is turned on, and there is no electrical contact by a person with the power supplied to said electrically connected device; and
- a disabling device for supplying a disabling signal to said control circuit to control said connector to said second connector state when the plug of the electrically connected device is inserted into the female electrical connectors of the receptacle and there is electrical contact by a person with the power supplied to said electrically connected device;
- wherein said control circuit includes a circuit element operable between:
  - a first control state, in response to said enabling signal from said enabling device, in which a control signal is supplied by said circuit element to said connector to provide that said connector is in said first connector state, and
  - a second control state, in response to said disabling signal from said disabling device, which prevents supply of said control signal to said connector to provide that said connector is in said second connector state; and
- wherein said disabling device includes:
  - a disabling circuit element for supplying said disabling signal to said control circuit so that said control circuit is operable in said second control state which prevents supply of said control signal to said connector to provide that said connector is in said second connector state;
  - an intermediary disabling circuit that supplies a signal to turn on said disabling circuit element; and
  - an initial disabling circuit which produces an initial disabling signal to control said intermediary disabling circuit to supply said signal to turn on said disabling circuit element when the plug of the electrically connected device is inserted into the female electrical connectors of the receptacle and there is electrical contact by a person with the power supplied to said electrically connected device.

10. An electric safety socket according to claim 9, wherein said disabling circuit element includes a transistor having a base supplied with the signal from the intermediary disabling circuit, and an emitter-collector path which supplies neutral as said disabling signal to said control circuit to control said connector to said second connector state.

11. An electric safety socket according to claim 9, wherein said initial disabling circuit includes a winding of a transformer through which power is supplied from the mains to the female electrical connectors of the receptacle, and which produces said initial disabling signal when there is electrical contact by a person with the power supplied to said electrically connected device which results in unbalance of power supplied from the mains to the female electrical connectors of the receptacle.

12. An electric safety socket according to claim 11, further comprising a reset switch connected with the disabling device for deactivating said disabling device.

* * * * *